United States Patent [19]

Freigang et al.

[11] Patent Number: 5,261,471
[45] Date of Patent: Nov. 16, 1993

[54] PRESSURE RELIEF VALVE

[75] Inventors: Alan R. Freigang, Portage; Thomas L. Runels, Battle Creek; Gary R. Schultz, Kalamazoo, all of Mich.

[73] Assignee: Eaton Corporation, Cleveland, Ohio

[21] Appl. No.: 860,486

[22] Filed: Mar. 30, 1992

[51] Int. Cl.⁵ ................ B60C 23/00; F16K 31/528
[52] U.S. Cl. ........................................ 152/415; 251/83
[58] Field of Search .......... 152/415, 416, 417, 431; 137/223, 224; 251/82, 83

[56] References Cited

U.S. PATENT DOCUMENTS

| | | | |
|---|---|---|---|
| 529,588 | 11/1894 | Bridges | 137/224 |
| 1,415,407 | 5/1922 | Schweinert et al. | 137/224 |
| 1,429,047 | 9/1922 | Payne | 137/234 |
| 3,537,469 | 11/1970 | Hagar | 137/224 X |
| 4,015,623 | 4/1977 | Wanstreet | 137/224 |
| 4,640,331 | 2/1987 | Braun et al. | 152/417 |
| 4,782,879 | 11/1988 | Le Chatelier et al. | 152/417 |
| 4,922,946 | 5/1990 | Boulicault | 137/102 |

*Primary Examiner*—Michael W. Ball
*Assistant Examiner*—Frances J. Lorin
*Attorney, Agent, or Firm*—P. S. Rulon

[57] ABSTRACT

A vehicle including a pressure relief valve mounted on a wheel is provided. The valve includes a spring biased vent valve mechanism therein and a blocker which is a actuable or manipulable to either a vent position or a nonvent position. When the blocker is in the vent position, the valve acts as a vent valve. When the blocker is in the nonvent position, the spring biased valve mechanism is prevented from opening.

11 Claims, 2 Drawing Sheets

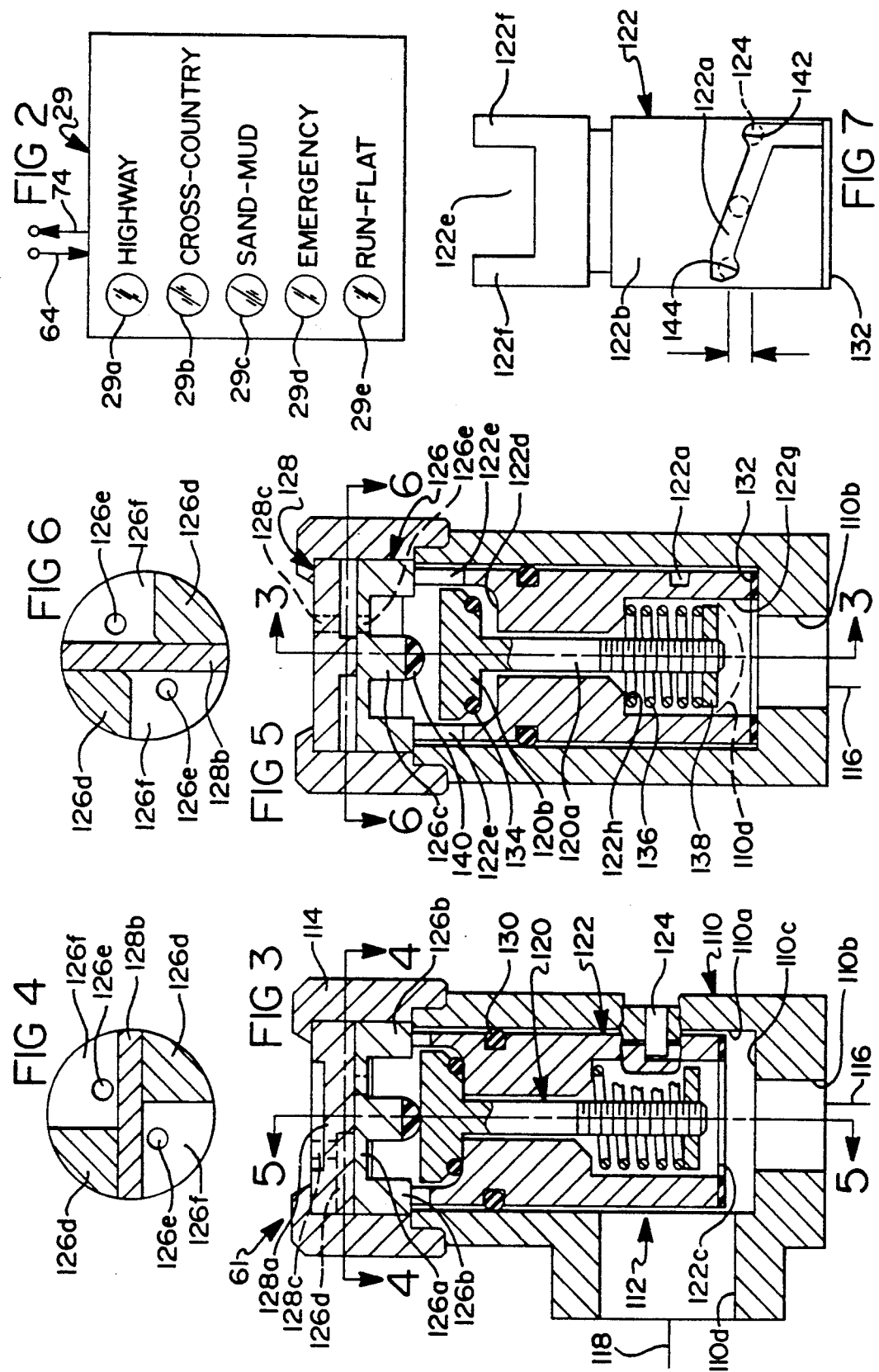

PRESSURE RELIEF VALVE

FIELD OF THE INVENTION

This invention relates to a selectively operative relief valve having application to vehicle tires and adapted for use with central tire inflation systems (CTI Systems or CTIS) also known as on-board inflation systems or traction systems. Such systems monitor and vary tire pressure from a remote location on the vehicle while the vehicle is at rest and/or in motion.

DESCRIPTION OF THE PRIOR ART

Central tire inflation systems are well known in the prior art as may be seen by referenced to U.S. Pats. Nos. 4,640,331; 4,678,017; 4,754,792; 4,782,879; 4,804,027; 4,883,106; 4,898,216; 4,922,946; 4,924,926; and published European Patent Applications 0,297,837; 0,352,921; and U.S. Pat. applications Ser. Nos. 726,067 filed Jul. 5, 1991 now U.S. Pat. No. 5,174,839, and 753,562 filed Sep. 3, 1991, and 792,552 filed Nov. 15, 1991 now U.S. Pat. No. 5,180,456. The disclosures of these patents and applications are incorporated herein by reference.

It is known that air pressure in vehicle tires can be varied to change tractive ability of the tires depending on the condition of the tire's operating surface, e.g., pavement, snow, off-road, etc. The tire pressure can be manually varied at each tire, or automatically or semi-automatically varied via CTI systems such as disclosed in the above mentioned patents and applications. Further, it is also known that vehicle height can be reduced by decreasing tire pressure. The amount of height reduction, of course, depends on tire profile. Hence, the greater the tire profile the more the vehicle height may be reduced. The selectively operative relief valve disclosed hereinafter may be employed to reduce tire pressure to a predetermined amount in vehicles with or without CTI systems.

SUMMARY OF THE INVENTION

An object of this invention is to provide a valve selectively operative to reduce a fluid pressure to a predetermined amount.

Another object of this invention is to provide such a valve for reducing the pressure of tires on a vehicle and thereby reduce the vehicle height.

According to a feature of this invention, a vehicle comprises at least one valve assembly, at least one rotatably mounted wheel including a tire supported thereon and having an inflatable volume, and air supply means for providing the volume with normal operating pressure greater than a first predetermined amount and less than a greater second predetermined amount. The valve assembly includes a valve housing affixed to the wheel and having a first port fluidly communicating with air pressure in the volume and having a vent port and a first valving means disposed in the housing and biased toward a closed position by a closing force of a spring means and toward an open position by an opening force of the air pressure at the first port. The first valving means is operative in the closed and open positions respectively to prevent and allow air flow from the first port to the vent port.

The invention is characterized by the air pressure opening force exceeding the spring means closing force in response to the air pressure at the first port being greater than the first predetermined amount; and blocker means for preventing the opening of the first valving means in response to the air pressure at the first port being between the first and second predetermined amounts in response to selective movement of an actuation means from a vent position to a nonvent position.

BRIEF DESCRIPTION OF THE DRAWINGS

The CTI system of the present invention is shown in the accompanying drawings in which:

FIG. 2 is a schematic illustration of an operator control panel for changing demand or desired tire pressure;

FIG. 3 is a sectional view of a relief valve in FIG. 1 and looking along line 3—3 of FIG. 5 with a valve mechanism therein in one operating position;

FIG. 4 is a sectional view of a portion of the valve mechanism in FIG. 3 and looking along line 4—4 of FIG. 3;

FIG. 5 is a sectional view of the relief valves in FIGS. 1, 3 and 4 looking along line 5—5 of FIG. 3 with the valve mechanism therein in a different operating position;

FIG. 6 is a sectional view of the valve portion in FIG. 4 looking along line 6—6 of FIG. 5; and FIG. 7 is a relief view of a valving member in FIGS. 3 and 5.

DETAILED DESCRIPTION OF THE DRAWINGS

Figure 1:
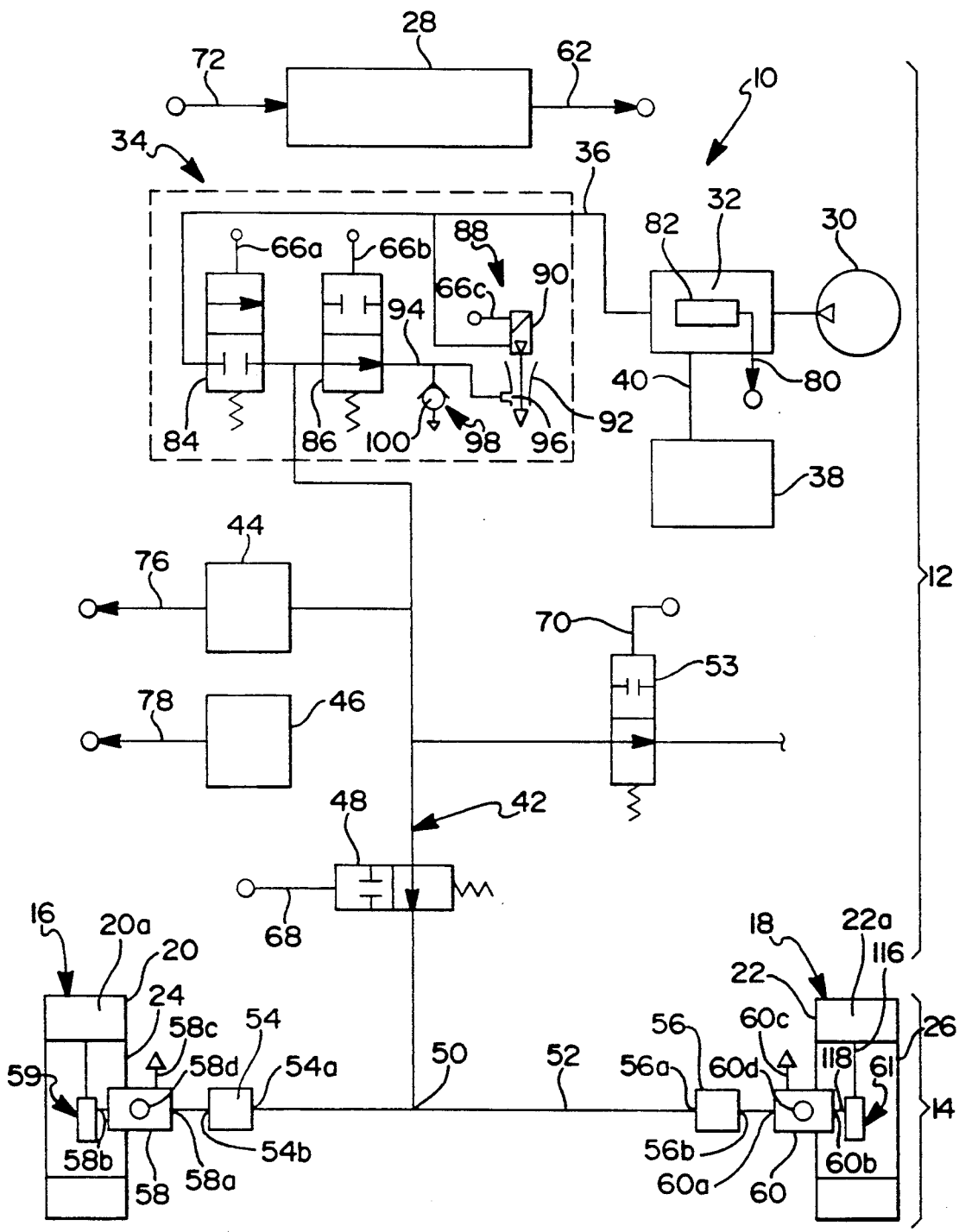
FIG. 1 is a brief schematic illustration of the CTI system air, electronic and wheel components.

The schematic of FIG. 1 illustrates a CTIS 10 for a vehicle having system components mounted on a body/chassis represented by a bracket 12 and components mounted on an axle assembly represented by a bracket 14. The axle assembly includes left and right wheel assemblies 16,18. The vehicle is preferably, but not necessarily, of the heavy duty truck type or special duty type. The axle assembly may be a steer or nonsteer axle, a drive or nondrive axle, and/or a tandem axle. The wheel assembly may be of the single or dual wheel type. The CTIS measures and controls the inflation pressure of interior volumes 20a,22a of tires 20,22 mounted on wheels 24,26 of the wheel assemblies. The CTIS herein controls tire pressure of groups of tires, e.g., the tires on a steer axle, single or tandem drive axles, and in some installations tires on trailer axles.

The chassis mounted components include a microcontroller 28, a vehicle operator control panel 29 shown in FIG. 2, a source of pressurized air including a compressor 30 normally driven by the vehicle engine and an air tank 32 connected to a pneumatic control assembly 34 via a conduit 36 and to a vehicle brake system 38 via a conduit 40, an air manifold 42, a manifold air pressure sensor 44, a vehicle speed sensor 46, an axle valve 48 fluidly connected between manifold 42 and a T-connector 50 in a conduit 52 extending between the left and right tires of axle assembly 14. Any additional number of axle valves 53 may be provided for other axle assemblies. Alternatively, the axle valves may be configured to separately communicate the left and right tire volumes with manifold 42.

Conduit 52 fluidly communicates with each tire volume 20a,22a via rotary seal assemblies 54,56, each having a non-rotable port 54a,56a and a rotatable port 54b,56b, wheel valves 58,60, and selectively operative pressure relief valves 59,61 explained further hereinafter. Examples of rotary seals may be seen by reference to U.S. Pat. Nos. 4,640,331; 4,804,027; 4,883,106 and U.S. application Ser. No. 726,067. Each valve 58,60 includes an inlet 58a,60a communicating with conduit 52 via the associated rotary seal and an outlet 58b,60b communicating with the associated tire volume via relief valves 59,61. Preferably, each valve includes a valve means (58d,60d) for venting the associated tire volume to a vent or atmospheric opening 58c,60c in response to some form of command from microcontroller 28. The atmospheric opening may be at the wheel valve, as disclosed in U.S. Pat. Nos. 4,678,017; 4,782,879; 4,922,946 and U.S. patent application Ser. No. 753,562. Alternatively, the atmospheric opening may be remote from the wheel valve as disclosed in U.S. Pat. No. 4,640,331, therein the atmospheric opening is provided by a quick release valve positioned in lieu of T-connector 50.

Wheel valves 58,60, as contemplated for use in the CTIS embodiment herein, block air communication between the tire volumes 20a,22a and the associated valve inlets 58a,60a and atmospheric openings 58c,60c when air pressure at the inlet is substantially at atmospheric pressure. When the air pressure at inlets 58a,60a is a predetermined pressure above atmospheric pressure, valve means 58d,60d of the valves allow fluid communication of the tire volumes with conduit 52. When the air pressure at the inlets 58a,60a is a predetermined pressure less (vacuum) than atmospheric pressure, the valve means allow fluid communication of the tire volumes with the associated atmospheric openings 58c,60c. Alternatively, the CTIS may be provided with wheel valves which are closed when air pressure at the inlets is substantially equal to atmospheric pressure, open for inflating the tires when the inlet air pressure is above a first predetermined minimum, and in a vent position when the inlet pressure is a predetermined pressure above atmospheric pressure and below tire pressure.

Microcontroller 28 includes a programmed microprocessor device/devices for processing and issuing command output signals via an output wiring harness 62. Harness 62 is connected to control panel 29 via a wiring harness 64, to pneumatic controller assembly 34 via conductors 66a,66b,66c and to axle valves 48,53 via conductors 68,70. The output signals are generated in accordance with known logic rules and in response to input signals received via an input wiring harness 72. Details of programming such microprocessor devices are known and rather straightforward given a flow diagram for the program. Input harness 72 receives signals from control panel 29 via a wiring harness 74, manifold pressure signals for pressure sensor 44 via a conductor 76, vehicle speed signals from speed sensor 46 via a conductor 78, and an air source pressure signal from a conductor 80 connected to a pressure sensor 82 on air tank 32. Microcontroller 28 renders the CTIS inoperative whenever the air source pressure signal indicates that the air source pressure is less than needed for safe operation of the vehicle brakes. As is known in the art, CTIS microcontroller 28 is programmed to issue a tire pressure check command at vehicle start-up and periodically during vehicle operation. If the pressure check indicates that current tire pressure $P_C$ is greater than or less than a demand pressure $P_D$, the controller issues either a deflate or inflate command.

Operator control panel 29, as shown herein, includes light emitting push switches 29a,29b,29c,29d,29e respectively labeled "Highway", "Cross-Country", "Sand-Mud", "Emergency", and "Run Flat". Of course more or fewer switches may be provided. Additional detail concerning panel 29 may be seen by reference to U.S. Pat. No. 4,754,792 and published European Patent Application 0,297,837. Switches 29a through 29d instruct the microcontroller to maintain the vehicle tires at a demand pressure $P_D$ corresponding to the labeled type operation of switches 29a-29d. For example, activation of switch 29a may correspond to a tire pressure of 3.02 bar (45 psi), switch 29b corresponds to a pressure of 2.35 bar (35 psi), switch 29c corresponds to a pressure of 1.68 bar (25 psi), and switch 29d corresponds to a pressure of 0.8 bar (12 psi). The microcontroller may be programmed to override the reduced pressure setting of switches 29b,29c,29d when the vehicle exceeds a predetermined speed, e.g., 65 Km/hr (40 MPH). Activation of Run-Flat switch 29e instructs the microcontroller to increase the pressure check frequency and to maintain tire pressure corresponding to which switch 29a-29d is activated.

Pneumatic control assembly 34 includes a pressure check and inflate valve 84, a vacuum and manifold vent valve 86, and a vacuum generator 88 including a solenoid valve 90 connected to the air source 32 and a venturi 92. Valve 84 has an inlet connected to the positive pressure of the air source via conduit 36 and an outlet connected to manifold 42. Valve 86 has an inlet connected to manifold 42 and an outlet connected via a conduit 94 to a small orifice 96 opening into the throat of the venturi. The venturi produces a vacuum or negative air pressure in conduit 94 relative to ambient atmospheric air pressure in response to a deflate signal from the microcontroller opening solenoid valve 90 to allow a stream of air from the air source to flow through the venturi. Conduit 94 is also connected to a one-way vent valve 98 for effecting rapid venting of positive air pressure in conduit 94. Vent valve 98 includes a valving member 100 drawn to a closed position in response to a negative air pressure in conduit 94 and moved to the open position against a biasing force in response to positive pressure air in conduit 94.

CTIS 10 is designed to automatically maintain tire pressure at or near demand pressure $P_D$ selected by control panel 29 in accordance with microcontroller programming. The vehicle operator has the capability of commanding the system to decrease or increase tire pressure for improving tire traction or increasing load carrying capacity of the vehicle by merely activating the appropriate control panel switch. The system automatically increases tire pressure if the vehicle speed, as monitored by speed sensor 46, exceeds a predetermined speed for the selected tire pressure.

When the vehicle ignition is energized and pressure switch 82 is closed, controller 28 initiates a pressure check sequence of the tires on each of the axle assemblies. If tire pressure of any of the axles is found to be a predetermined amount less than demand pressure, an inflation sequence is initiated for the axle or axles effected. During vehicle operation, the microcontroller automatically initiates periodic pressure check sequences. When enhanced or maximum traction is required, the vehicle operator may command reduced tire pressure by pushing the appropriate switches on control panel 29; if the vehicle speed is greater than a predetermined amount for the selected reduced pressure, the microcontroller will not initiate the appropriate pressure deflation sequence.

With control assembly valves 84,86 and axle valves 48,52 in the positions of FIG. 1 and with vacuum source solenoid valve 90 closed, manifold 42, conduit 52 and each of the rotary seals 54,56 are vented to atmosphere through vacuum generator 88 and vent valve 98 via vacuum control valve 86. Wheel valves 58,60 close in response to this venting.

A pressure check sequence is initiated for axle assembly 14 by energizing valves 86,53 to the closed positions and momentarily energizing valve 84 to the open position to provide positive air pressure sufficient to move valving means of wheel valves 58,60 to positions intercommunicating the inlets and outlets thereof. De-energization of valve 84 returns the valving member therein to the closed position. With valve 84 closed and valves 48,58,60 open, the pressure in manifold 42 and conduit 52 soon equalizes to tire pressure. The microcontroller reads this pressure via electrical signals from sensor 44 and initiates inflate/deflate sequences as required. If no further sequence is required, vacuum valve 86 is de-energized to effect its open position, thereby connecting the wheel valve assembly inlet ports to the vent through vacuum generator 88 and vent valve 98.

A tire deflation sequence is initiated for axle assembly 14 by energizing valves 48,53 to the closed position and energizing vacuum source solenoid 90 to the open position to provide a negative air pressure in manifold 42. Adequate vacuum sensed at pressure sensor 44 causes microcontroller 28 to de-activate valves 48 and/or 53, creating negative pressures in conduit 52 and at inlets 58a,60a, moving the wheel valve valving means to positions connecting outlets 58b,60b to vents 58c,60c illustrated in FIG. 1. The deflation sequence is terminated by de-energizing vacuum source solenoid valve 90 to the closed position. An example of details of a tire deflation sequence may be seen by reference to published European Patent Application 0,352,921.

Referring now to the relief valve assemblies as shown in FIGS. 3-7, since these valve assemblies are identical herein, only valve assembly 61 is described in detail. Valve assembly 61 includes a housing body 110 having a cylindrical walled bore 110a containing a valving mechanism 112 retained in the bore by a cap 114 having an open center and secured to the housing body in known manner. The housing includes a first port 110b connected to tire inflatable volume 22a via a passage 116 and communicating with bore 110a via a central opening in a valve seat 110c at one end of the bore, and a second port 110d defining a transverse passage opening at one end into the cylindrical wall of bore 110a and connected at the other end to wheel valve outlet port 60b via a passage 118. In the event valve 61 is employed in a vehicle not having a CTI system, second port 110d may have a manual fill valve affixed therein or the port deleted if the tire is provided with a conventional manual fill valve.

Valving mechanism 112 includes a poppet type relief valve 120, a spool valve 122, and an actuation mechanism including a cam slot 122a and a pin 124 for effecting axial movement of the spool in response to rotation of the spool by members 126,128. Spool 122 includes an outer cylindrical surface 122b, an o-ring seal 130 disposed in an annular groove in the cylindrical surface and in sliding sealing cooperation with the cylindrical wall of bore 110a, a first end 122c having an annular seal 132 affixed thereto, a second end defining a valve seat 122d and a castellated skirt portion extending upward therefrom with two recesses 122e therein and circumferentially separated by two fingers 122f, and a stepped central through opening 122g extending from the first end to the second end of the spool.

Poppet valve 120 includes a stem portion 120a slidably disposed in spool opening 122g with sufficient clearance to allow relatively free flow of air therealong, a head portion 120b carrying an o-ring seal 134 operative when engaged with spool valve seat 122d to prevent air flow along the stem, and a helical compression spring 136 reacting between a shoulder 122h defined by the step in opening 122g and a retainer 138 threadably attached to the stem. Spool 122 is shown in its up or open position in FIG. 3 for allowing air flow between ports 110b,110d and is shown in its down or closed position in FIG. 5 for preventing air flow between the ports. Spring 136 is preloaded to provide a closing force insufficient to maintain poppet valve 120 closed when an open force acting thereon by air pressure at port 110b (i.e., tire pressure) is greater than a first predetermined tire pressure corresponding to a minimum tire pressure for tractive effort purposes.

Actuation member 126 includes a disk portion 126a having a pair of fingers 126b extending downward from the outer periphery thereof and slidably received in spool recess 122e, a stop or blocker 126c extending downward from the center thereof and having an elastic tip 140 affixed thereto, two pie like shaped raised portions 126d in the upper surface thereof, and two vent holes 126e opening into pie shaped valleys 126f between the raised portions. Actuation member 128 includes a disk portion 128a, a downwardly extending rail-like portion 128b, two vent holes 128c, one of which is shown in phantom lines in FIG. 3 and the other likewise shown in FIG. 5, and a slot 128d in the upper surface for a tool such as a screwdriver blade for rotating members 128,126 and spool 122 to effect the vent and nonvent positions of valving mechanism 112. Alternatively, member 128 may be rotated by an electrical or hydraulic device, etc. and controlled from a remote location.

In the nonvent position of FIGS. 3 and 4, clockwise rotation of member 128 has positioned the upper surface of raised portions 126d to block vent holes 128c and has rotated member 126 and spool 122 to cause slot 122a and pin 124 to move spool up, whereby air freely flows between ports 110b,110d and the elastic tip of blocker 126c contacts poppet valve head 120b to prevent opening of the poppet valve substantially independent of the air pressure acting thereon. In the full up position of the spool, pin 124 is maintained at the right end of slot 122a by a detent 142. Alternatively, blocker 126c may apply a resilient closing force sufficient to prevent opening of the poppet valve in response to a maximum predetermined tire pressure when the spool is in the up position. Such an alternative configuration would, of course, require modification of members 126,128 to allow venting of holes 126e.

To effect the vent position of FIGS. 5 and 6, member 128 is rotated one-hundred and eighty degrees counterclockwise from the nonvent position. The first ninety degrees aligns vent holes 128c,126e without rotation of member 126 and spool 122. Thereafter, the sides of rail portion 128b contact the sides of raised portions 126d to rotate spool 122 ninety degrees counterclockwise and cause cam slot 122a and pin 124 to move spool down, whereby seal 132 engages valve seat 110c to prevent air flow between ports 110b,110d and blocker 126c is disengaged so as to allow opening of the poppet valve and venting of air at port 110b (i.e., tire pressure) until the pressure decreases to a predetermined minimum for reducing vehicle height. In the full down position of the spool, pin 124 is maintained at the left end of slot 122a by a detent 144.

Valve 61 is contemplated for use in vehicle CTI systems having wheel valves, such as valves 58,60 or the like, which isolate the tire volumes from the on-board source of air pressure, in continuous pressure CTI systems not having wheel valves and continuously communicating the on-board source of air pressure with the tire volumes, and in vehicles not having CTI systems. The air flow shutoff feature provided by valve seat 110c and seal 132 allows valve 61 to be incorporated in CTI systems not having means to lower tire pressure to amounts less than amounts for only improving the tractive ability of the tires.

A preferred embodiment of the invention has been disclosed for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A vehicle comprising at least one valve assembly, at least one rotatably mounted wheel including a tire supported thereon and having an inflatable volume normally containing an air pressure greater than a first predetermined amount and less than a greater second predetermined amount; the valve assembly including a valve housing affixed to the wheel and having a first port fluidly communicating with air pressure in the volume and having a vent port, a first valving means disposed in the housing and biased toward a closed position by a closing force of a spring means and toward an open position by an opening force of the air pressure at the first port; the first valving means operative in the closed and open positions respectively to prevent and allow air flow from the first port to the vent port; the improvement characterized by:

the air pressure opening force exceeding the spring means closing force in response to the air pressure at the first port being greater than the first predetermined amount; and blocker means for preventing the opening of the first valving means in response to the air pressure at the first port being between the first and second predetermined amounts, the blocker means operative to prevent the opening of the first valving means in response to selective movement of an actuation means from a vent position to a nonvent position.

2. The vehicle of claim 1, wherein the valve housing includes a second port for communicating with the first port and a vehicle on-board tire inflation system comprising:

an air source providing pressurized air for inflating the tire volume via a conduit means;

a rotary seal assembly having a non-rotatable port and a rotatable port, the non-rotatable port connected to the conduit means for communicating the pressurized air in the conduit means to the valve assembly second port via the rotatable port.

3. The vehicle of claim 2, wherein the on-board tire inflation system further includes:

a wheel valve affixed to the wheel and having an outlet port connected to the valve assembly second port, an inlet port connected to the rotatable port, and valving means movable between open and closed positions respectively for allowing and preventing air communication between the inlet and outlet ports;

control means operative to communicate the air source pressurized air to the conduit means for moving the wheel valve valving means to the open position and inflating the inflatable volume between the first and second predetermined amounts; and wherein;

the valve assembly includes a second valving means disposed in the housing and movable between open and closed positions respectively for allowing and preventing air communication between the first and second ports respectively in response to movement of the actuation means from the nonvent position to the vent position, respectively.

4. The vehicle of claim 3, wherein:

the housing includes a cylindrical bore having an annular valve seat at a first end thereof with a central opening for communicating with the first port, having a second end for communicating with the vent port, and having a transverse passage opening into the bore between the first and second ends thereof for communicating the bore with the second port;

the second valving means including a spool having an outer cylindrical surface disposed for sliding sealing relation with an inner cylindrical surface of the bore between the transverse passage opening and the bore second end, a first axially facing end of the spool movable into and out of sealing relation with the annular valve seat for respectively preventing and allowing air flow between the first and second ports in response to axial movement of the spool, a central opening extending through the spool from the first end thereof to a second end thereof; and the first valving means including a poppet valve having a stem disposed in the spool central opening and a head biased into sealing relation with the spool second end by the spring means for preventing air flow along the spool central opening from the spool first end, past the valve head and to the vent port, and the poppet valve head moved into contact with the blocker means to prevent the opening of the poppet valve in response to the actuation means moving the spool first end out of sealing relation with the annular valve seat.

5. The vehicle of claim 4, wherein:

the actuation means includes a cam groove in the outer cylindrical surface of the spool, pin means affixed to the housing and extending into the groove, and means operative to rotate the spool to-and-fro to effect axial reciprocating movement of the spool in the bore in response to reaction between the pin means and sidewalls of the groove.

6. A valve assembly comprising a housing including a first port adapted to be connected with air pressure in a volume, a second port adapted to be connected with a source of pressurized air for increasing the air pressure in the volume, a vent port, and a first valving means disposed in the housing and biased toward a closed position by a closing force of spring means and toward an open position by an opening force of air pressure at the first port, the first valving means operative in the closed and open positions respectively to prevent and allow air flow from the first port to the vent port; characterized by:

a second valving means disposed in the housing and movable between open and closed positions respectively to allow and prevent air flow between the first and second ports independent of the air pressure amount at the first and second ports;

blocker means operative in response to the second valving means open position to prevent movement of the first valving means to the open position thereof in response to the opening force of the air pressure exceeding the closing force of the spring means; and actuation means for selectively moving the second valving means between the open and closed positions thereof.

7. The valve assembly of claim 6, wherein:

the housing including a cylindrical bore having an annular valve seat at a first end thereof with a central opening for communicating with the first port, having a second end for communicating with the vent port, and having a transverse passage opening into the bore between the first and second ends thereof for communicating the bore with the second port;

the second valving means including a spool having an outer cylindrical surface disposed for sliding sealing relation with an inner cylindrical surface of the bore between transverse passage opening and the bore second end, a first axially facing end of the spool movable into and out of sealing relation with the annular valve seat for respectively preventing and allowing air flow between the first and second ports in response to axial movement of the spool, and a central opening extending through the spool from the first end thereof to the second end thereof; and the first valving means including a poppet valve having a stem disposed in the spool central opening and a head biased into sealing relation with the spool second end by the spring means for preventing air flow from the spool first end along the spool central opening past the valve head and to the vent port, and the poppet valve head moved into contact with the blocker means to prevent the opening of the poppet valve in response to the actuation means moving the spool first end out of sealing relation with the annular valve seat.

8. The valve assembly of claim 6, wherein:

the actuation means includes a helical groove in the outer cylindrical surface of the spool, pin means affixed to the housing and extending into the groove, and means operative to rotate the spool to-and-fro to effect axial reciprocating movement in the bore in response to reaction between the pin means and sidewalls of the groove.

9. The valve assembly of claim 6, further including a vehicle comprising at least one rotatably mounted wheel including a tire supported thereon and having an inflatable volume; the valve assembly affixed to the wheel, the valve assembly first port connected to the inflatable volume and the second port connected to the source of pressurized air.

10. The valve assembly of claim 9, wherein the vehicle includes an on-board tire inflation system having an air supply means comprises:

the air source providing pressurized air for inflating the inflatable volume via a conduit means;

a rotary seal assembly having a non-rotatable port and a rotatable port, the non-rotatable port connected to the conduit means for communicating the pressurized air in the conduit means to the valve assembly second port via the rotatable port.

11. The valve assembly of claim 10, wherein the on-board tire inflation system further includes:

a wheel valve affixed to the wheel and having an outlet port connected to the valve assembly second port, an inlet port connected to the rotatable port, and valving means movable between open and closed positions respectively for allowing and preventing air communication between the inlet and outlet ports;

control means operative to communicate the air source pressurized air to the conduit means for moving the wheel valve valving means to the open position and inflating the inflatable volume between the first and second predetermined amounts.

* * * * *